April 28, 1953  K. M. WATSON  2,636,575
CONTINUOUS ADSORPTION PROCESS
Filed Aug. 20, 1947  5 Sheets-Sheet 3

INVENTOR
KENNETH M. WATSON
BY
Pennie, Edmonds, Morton and Barrows
ATTORNEYS

April 28, 1953  K. M. WATSON  2,636,575
CONTINUOUS ADSORPTION PROCESS
Filed Aug. 20, 1947  5 Sheets-Sheet 4

INVENTOR
KENNETH M. WATSON
BY
ATTORNEYS

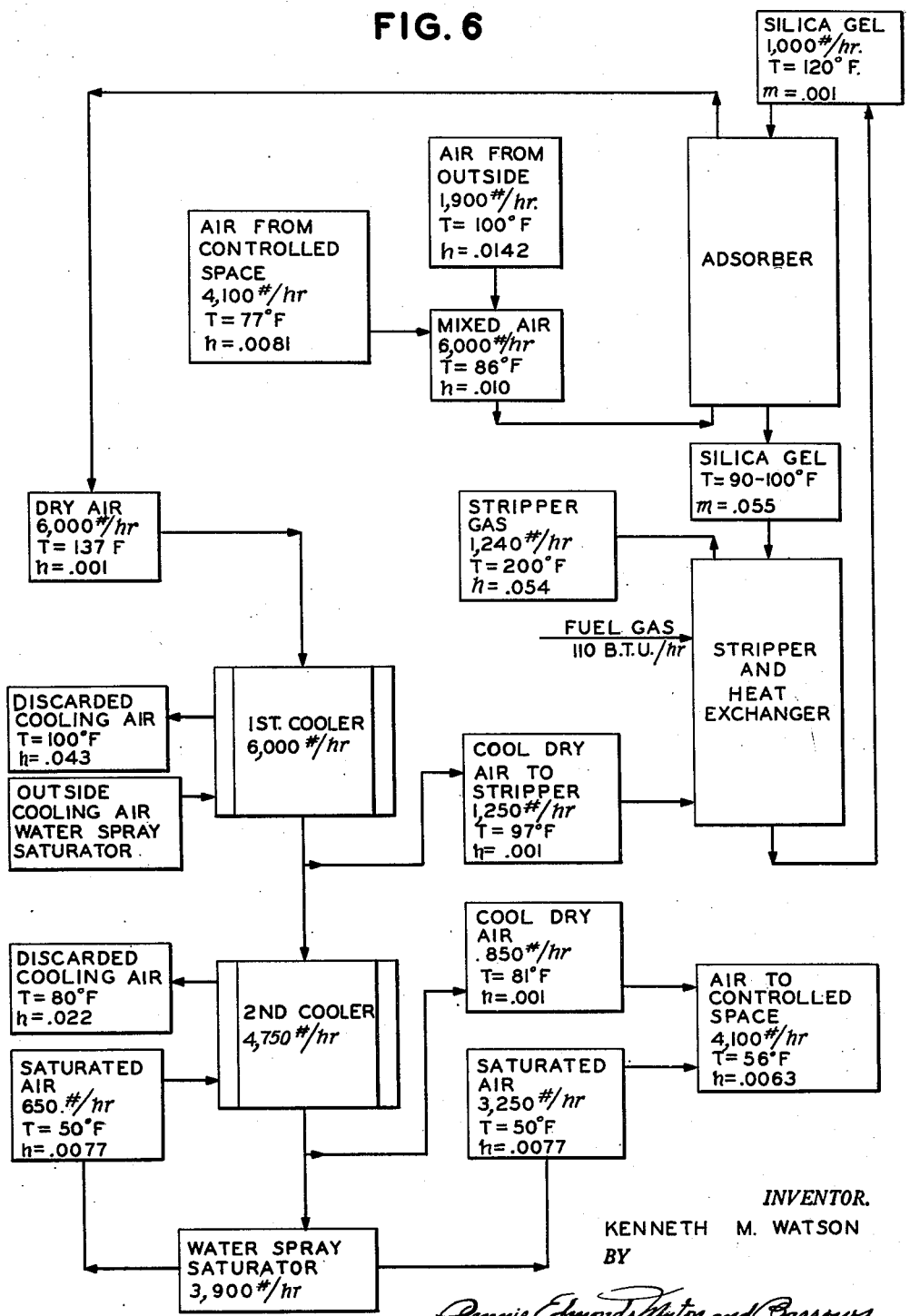

Patented Apr. 28, 1953

2,636,575

UNITED STATES PATENT OFFICE 2,636,575

CONTINUOUS ADSORPTION PROCESS

Kenneth M. Watson, Madison, Wis.

Application August 20, 1947, Serial No. 769,630

2 Claims. (Cl. 183—114.2)

This invention relates to a process and apparatus for the continuous contacting of gases with a thin, moving bed of solid material with continuous cross-flow of the gases through the moving bed of solids in a generally counter-current manner.

The invention includes a new method and apparatus for the removal of an adsorbate material from a gas stream by contacting the gas with an adsorbent bed moving in continuous flow and in a generally downwardly direction across the gas stream through successive stages so arranged that the movement of the adsorbent from stage to stage is in counter-flow to that of the gas.

The invention also includes an improved process and apparatus for the drying of solid material for the removal of an adsorbate therefrom by similarly contacting a stream of drying gas with a bed of solid material moving in continuous flow across the gas stream through successive stages so arranged that the movement of the solid material from stage to stage is in counter-flow to that of the gas.

The invention also includes an improved process and apparatus for the removal of an adsorbate material from a gas stream with such a continuously moving adsorbent bed and the subsequent removal of the adsorbate from the solid material by the action of drying or stripper gases with the continuous flow of the solid material in a generally downward direction through the adsorbent and stripping stages and with cross-flow and counter-flow of the gas stream through the solid material in these successive stages.

The invention also includes an improved method and apparatus for the continuous contacting of gases and solids in successive stages in which the bed of solid material is passed through successive stages in general cross-flow and the counter-flow with the gases and in which the solid material is returned and repeatedly used over again.

The invention also includes an improved process and apparatus for the contacting of gases with solids to effect chemical reactions of the gases and vapors contained therein with a continuously flowing bed of solid material reacting with or having a catalytic effect on the gases or vapors and with cross-flow and counter-current flow of the gases and vapors, or with cross-flow and concurrent flow of the gases and vapors, through thin sections of solid material in a generally downward flow through the apparatus.

The invention also includes an improved method and apparatus for the dehumidification and conditioning of air and an improved heat exchanger for use in such air conditioning systems.

Adsorption processes are known in which beds of solid material are moved in direct counter-flow to the gas stream but such methods present difficulties in the distribution of the moving adsorbent bed and of the gases moving through the bed and involve a considerable pressure drop of the gas stream passing through the bed of solid material. If a shallow bed of solid material is used for direct counter-flow of the gases therethrough, a large cross-sectional area is required to obtain a low pressure drop of the gases passing therethrough, while it is difficult to insure a uniform supply of the solid adsorbent material to the entire area of the bed and any irregularities in the bed depth tend to cause serious channeling of the gases.

The present invention provides an improved method and apparatus in which such objections to the direct counter-current flow of the gas stream and solid material are overcome or are minimized. As compared with processes using solid beds moving in direct counter-flow to the gas stream, the improved process and apparatus of the present invention, utilizing cross-flow and counter-current flow of the gases and solids, permits provision of the required large cross section for the flow of gas through the adsorbent without excessive pressure drop and without serious difficulties in the distribution of the moving adsorbent. According to the present invention, the bed thickness of the solid material is held uniform, and uniform movement of the adsorbent is readily insured because of the small cross section of flow of the solid; and the effects of any irregularities in flow of the adsorbent are minimized by the successive contacting of the gas stream in different directions with the moving bed of adsorbent material.

According to the present invention, there is provided a vertical apparatus through which a thin bed of the solid material is caused to flow in a generally downward direction through successive zones separated from each other, and the gas stream is caused to flow back and forth through the thin layers of solid material in the successive zones in a generally counter-current manner. The bed of solid material is thus caused to move in a generally downward direction through the successive zones across the gas stream with the flow of the solid and gases through the successive stages so arranged that the movement of the solid material from stage to stage is in counter-flow to that of the gas.

When an adsorbate, for example, moisture in air, is to be removed from the air stream by contacting the air with an adsorbent bed, the operation is advantageously carried out in stages with the first stage removing the water from the air more or less completely and giving dry or relatively dry air while the adsorbent bed becomes moist with the adsorbed water; and the resulting adsorbent may then advantageously be passed to a stripper section where it is heated or contacted with heated gas to desorb the adsorbate, that is, to dry the solid material and remove the water more or less completely therefrom. The heated solid material is then advantageously cooled either by indirect heat exchange or by direct contact in counterflow with cooled dry gas going to the stripper section. The stripper and heat exchanger are not necessarily of the same continuous counter-stage cross-flow design employed in the adsorber but are advantageously so designed.

The invention will be further described and illustrated in connection with a specific and advantageous application thereof to the dehumidification of air with silica gel for the simultaneous control of temperature and humidity. The invention is, however, also applicable to the dehumidification of other gas streams and to the removal and recovery of other adsorbates from air or the gas stream. So also, a variety of solid adsorbates, such as activated charcoal, activated alumina, silica alumina gels, and the like, may be used; the particular adsorbent depending somewhat upon the particular application of the process and the particular adsorbate to be removed therewith.

The size of the solid material used in the present process can be somewhat varied but should be of a size which permits the solid material to flow downwardly in the form of a thin layer through which the gases will pass with a small pressure drop. The solid material should not be sufficiently fine that it will be carried away to any appreciable extent by the gases passing therethrough. The solid material may thus be used in the form of pellets or particles of an approximate uniform size such as pellets in the range of 25 to 4 mesh. The particular size of pellets or other pieces used will depend somewhat on the capacity and other design factors of the apparatus. It is important to remove fines produced by the movement of the bed as it is desirable to maintain an approximately uniform pellet size during the operation. Spherical pellets of about ⅛" in diameter or slightly smaller are advantageously used.

The optimum thickness of the downwardly moving bed is dependent upon a number of factors such as the size of the pellets, the mass velocity of flow of gas through the bed and the permissible pressure drop. For a representative air conditioning application using ⅛" pellets, the bed thickness may range from about ½" to 2" or more, but the thickness of the bed will depend somewhat upon the number of contacting stages.

The invention will be further described and illustrated in connection with the accompanying drawings which are of a somewhat conventional and diagrammatic character, but it will be understood that the invention is not limited thereto.

In the accompanying drawings:

Fig. 6 is a flow sheet illustrative of the operation of the apparatus of Fig. 3 for air conditioning.

Figure 1:
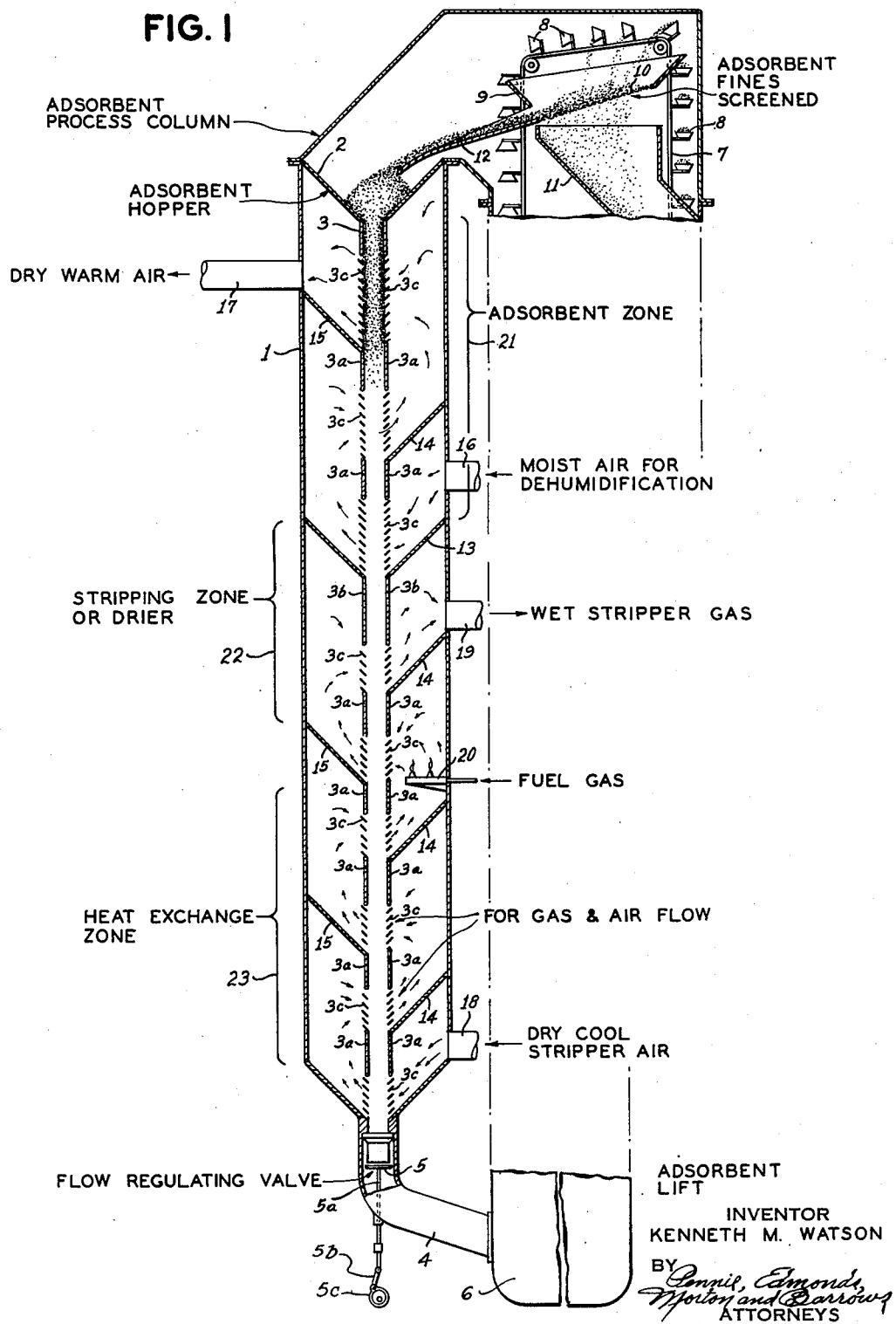
Fig. 1 is a vertical cross sectional view, somewhat diagrammatic in character, showing one form of apparatus for bringing about the cross-current and counter-current flow of gases and solid material and with provision for returning the solid material for reuse.

Referring first to Fig. 1, the apparatus shown includes an outer casing 1 of rectangular cross section having feed hopper 2 at the top for the solid adsorbent material and a central chamber 3 divided into zones and connected at the bottom with the outlet 4 having regulating valve 5 therein for regulating the discharge of solid material from the chamber.

The solid adsorbent material discharged through the outlet 4 at the bottom of the chamber is collected in the bottom of a compartment 6 having a bucket elevator 7 with buckets 8 carried thereby for lifting the solid material from the bottom of the compartment and discharging it at the top into a hopper 9 having an inclined screen 10 through which the fines pass into a collecting chute 11, while the adsorbent material free from fines passes downwardly through the chute 12 to the hopper 2. This arrangement of the bucket elevator and screen enables the solid material discharged at the bottom of the apparatus to be returned to the top and used over again after the separation of fines by screening. Added adsorbent material can be supplied as required to make up for losses due to separation of fines.

The bucket elevator illustrated, somewhat conventionally, is only one form of conveyor for returning the solid material from the bottom to the top of the apparatus and for separating fines therefrom; and a pneumatic conveyor and separator of fine material can be similarly used.

The central chamber 3 has a series of solid wall sections 3a and somewhat longer wall sections 3b, of a vertical width somewhat greater than the thickness of the bed of solid material; and between these solid sections are screens or louvres 3c which support the solid material and keep it from passing therethrough without interfering with its downward flow and which also permit gases to pass through the layer of solid material. While the thickness of the bed between the side supports may in practice be only around e. g. 2 inches, the side supports are shown somewhat disproportionately separated, with a thicker bed between them for purposes of illustration.

A central partition 13 extending between the upper end of the solid partitions 3b and the outer casing 1 divides the apparatus into an upper and lower zone connected only through the space between the vertical partition members 3b. A series of partitions 14 and 15 extend outwardly from the solid partition members 3a to the outer casing 1 and are alternately arranged as shown.

The regulating valve 5 is a control valve that extends along the entire bottom of the bed of material; and is shown as a moving-plate type of valve consisting of a horizontal plate 5, somewhat wider than the bottom outlet of the central chamber 3 and adjustably supported by shafts 5a extending downwardly through the bottom wall of the chamber 4 and connected at their lower ends to links 5b operated by eccentrics 5c by which the valve plate 5 can be raised or lowered. By raising the plate 5 to a point where its edges intercept the angle of repose of the adsorbent material, outflow of the adsorbent is stopped. By lowering the plate 5 flow is permitted and regulated. This arrangement of outlet valve is particularly advantageous as it avoids crushing the granular adsorbent material. The rate of flow of the granular material is determined by the distance between the plate 5 and the outlet of the chamber 3 and by oscillating the plate as required to give a uniform rate of flow.

An inlet for moist air to be dehumidified is indicated at 16 and an outlet for the dry air is indicated at 17. An inlet for dry cool air is shown at 18 near the bottom of the apparatus and an outlet for the wet stripper air or gas is shown at 19 and gas burners 20 are shown at an intermediate stage to heat the air and promote the drying of the solid material.

The arrangement shown in Fig. 1 is such that the cooled adsorbent such as silica gel flows in a solid bed from the elevated hopper 2 into a succession of contacting zones in which the gel is supported between louvres or screens to form a thin vertical bed. The air is caused to flow back and forth across this bed from the air inlet to the air outlet. The lateral and alternating partitions 14 and 15 and the sealing zones formed by the members 3a and 3b which have no openings in them cause the air to pass cross-wise and back and forth across the bed of solid material. The solid partition members 3a and 3b form sealing zones of a height such that the resistance to the flow of the air upwardly through them is greater than the resistance to the flow of the gases back and forth through the thin layers of solid material.

At the upper zone of the apparatus shown, which is an adsorption zone, indicated at 21, water is removed from the air and adsorbed by the gel. The lower portion of the apparatus is divided into two zones, namely a stripper zone 22 and a heat exchange or cooling zone 23. As the moist solid material passes downwardly from the adsorption zone to the stripping zone, hot gases are contacted therewith in a similar manner. The hot gases for stripping are generated by burning fuel gas in the burners 20 in a stream of dry air which is preheated in the heat exchange section. The stripped, hot gel or catalyst then passes down through the heat exchange zone where it is cooled by dry, cool stripper air which enters through the inlet pipe 18 and passes back and forth through the thin layer of solid material in the heat exchange zone, cooling the solid material and being itself preheated and being then further heated by the combustion of fuel gas as it passes into the stripping zone to strip the adsorbed water from the solid material. The resulting wet stripper gas passes out through the outlet pipe 19.

The stripped cooled catalyst or adsorbent is discharged from the bottom of the apparatus through the flow regulating valve 5 and is elevated to the hopper 2 at the top of the apparatus by a mechanical or pneumatic elevator. Dust and fines developed in the movement of the gel are removed by a stream of air or by passing over a properly sized screen. If a pneumatic elevator is used, the fines are removed in the air which carries the gel to the top of the apparatus.

With this arrangement of the apparatus a solid adsorbent is repeatedly used, being cooled to a dry cooled state at the bottom of the apparatus and being returned to the top of the apparatus after the separation of dust and fines therefrom. It passes downwardly successively through the adsorption zone where it dries the moist air, then down through the stripping zone where it is itself dried by the hot stripper gas and then down through the heat exchange zone where it is cooled before it is discharged from the apparatus; and it may be further cooled in its passage from the bottom of the apparatus to the top.

During this downward flow of the solid adsorbent material the moist air to be dehumidified and which enters at 16 passes back and forth through the thin bed of solid material and is discharged as dry air at 17. Dry cooled air enters the bottom of the apparatus at 18, passes back and forth through the thin bed of solid material to cool this material; and the resulting heated air is then further heated by the gas burners and the hot air passes back and forth through the solid material in the stripping zone and passes out of the apparatus at 19.

Figure 2:
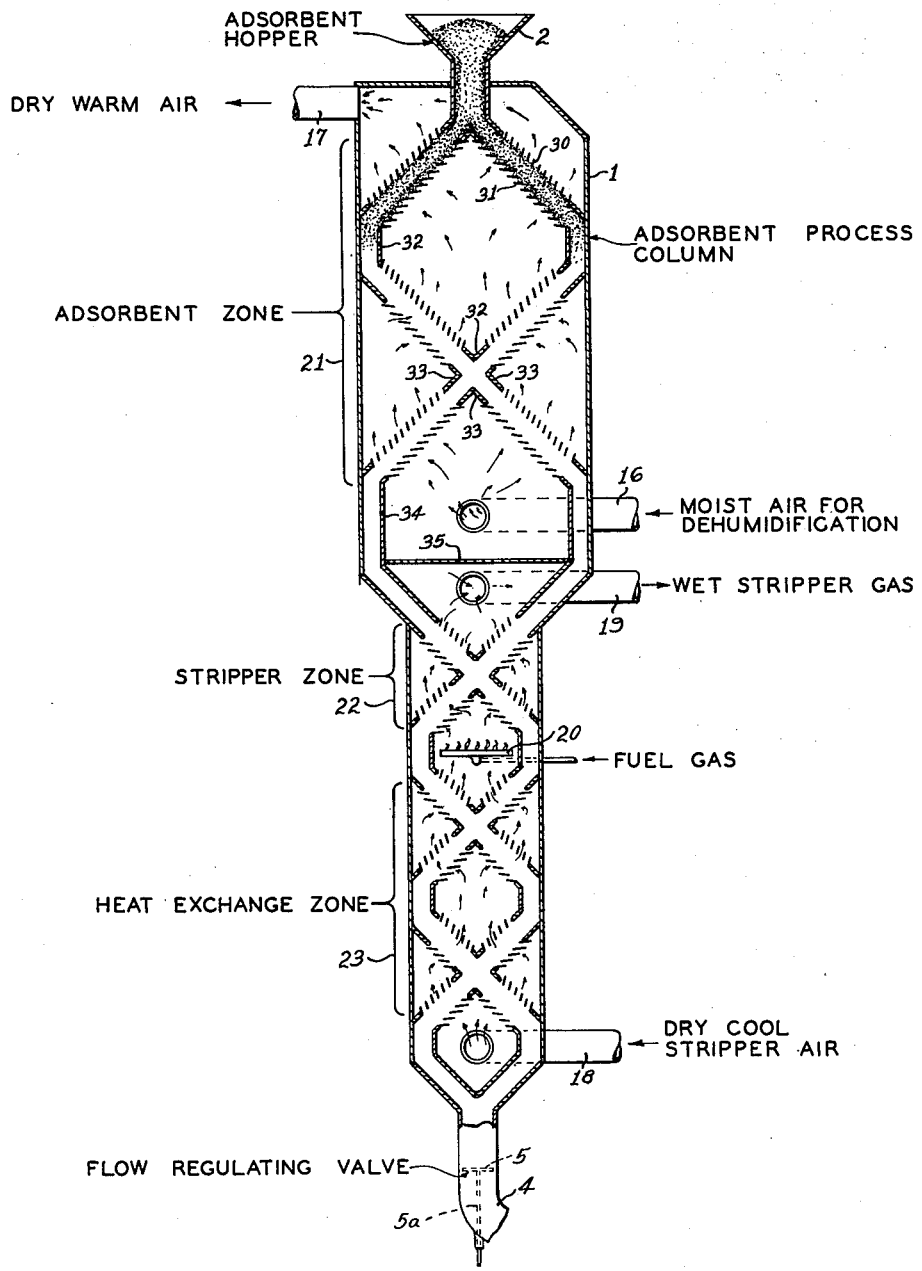
Fig. 2 shows a somewhat modified form of apparatus for the cross-current and counter-current flow of gases and solids.

A modified form of apparatus is illustrated in Fig. 2. In this modification of the apparatus the gases move vertically while the gel or other solid adsorbent material flows back and forth between supporting screens or louvres placed at an angle greater than the angle of repose of the solid material. This arrangement of apparatus has the advantage of providing a large cross section of adsorbent bed through which air is passed without undue height of the apparatus.

The corresponding parts of the apparatus of Fig. 2 are for the most part indicated by the same reference numerals as in Fig. 1. Instead of a centrally arranged chamber 3 divided into vertical zones as in Fig. 1, the louvres 30 and 31 are so arranged as to form between them a space through which the solid adsorbent material passes downwardly at an angle, first outwardly to the sides of the chamber and then inwardly to the middle. The intermediate zones, between the louvres, are formed by the imperforate portions 32 located near and spaced away from the sides of the casing 1 and by members 33 at the intermediate portions. The arrangement is such that the solid adsorbent entering from the hopper 2 is divided into two outwardly extending thin portions between the louvres 30 and 31. From this narrow space the material passes down between the members 32 and the side of the casing and then inwardly between the louvres to an intermediate portion adjacent the members 33 and then outwardly again as shown. The intermediate members 34 which separate the upper adsorption zone from the lower stripper zone are somewhat wider than the members 32 and the partition 35 serves as the driving partition for the air or gases in the upper adsorption and lower stripper zones of the apparatus. In this figure, as in Fig. 1, the width of the chamber 3, and the thickness of the bed in it, is exaggerated for purposes of illustration.

The operation of the apparatus and the carrying out of the process in the modification shown in Fig. 2 is similar to that described in Fig. 1 but the gases pass in a generally vertical direction through the diagonally arranged thin layers of adsorbent material while the material itself flows downwardly between the louvres or screens placed at an angle and is ultimately discharged from the bottom of the apparatus from which it can be returned to the top through a bucket elevator or pneumatic conveyor and with separation of dust and fines from the adsorbent material before it is returned for reuse.

The apparatus of Fig. 2 has in general the same provision for introducing and removing the air or other gas and the same adsorption, stripping and heat exchange zones as the apparatus of Fig. 1, and operates in a similar manner except for the different direction of flow of the adsorbent material and air or other gas because of the different arrangement of the contacting zones through which the gas is passed through the adsorbent material.

Figure 3:
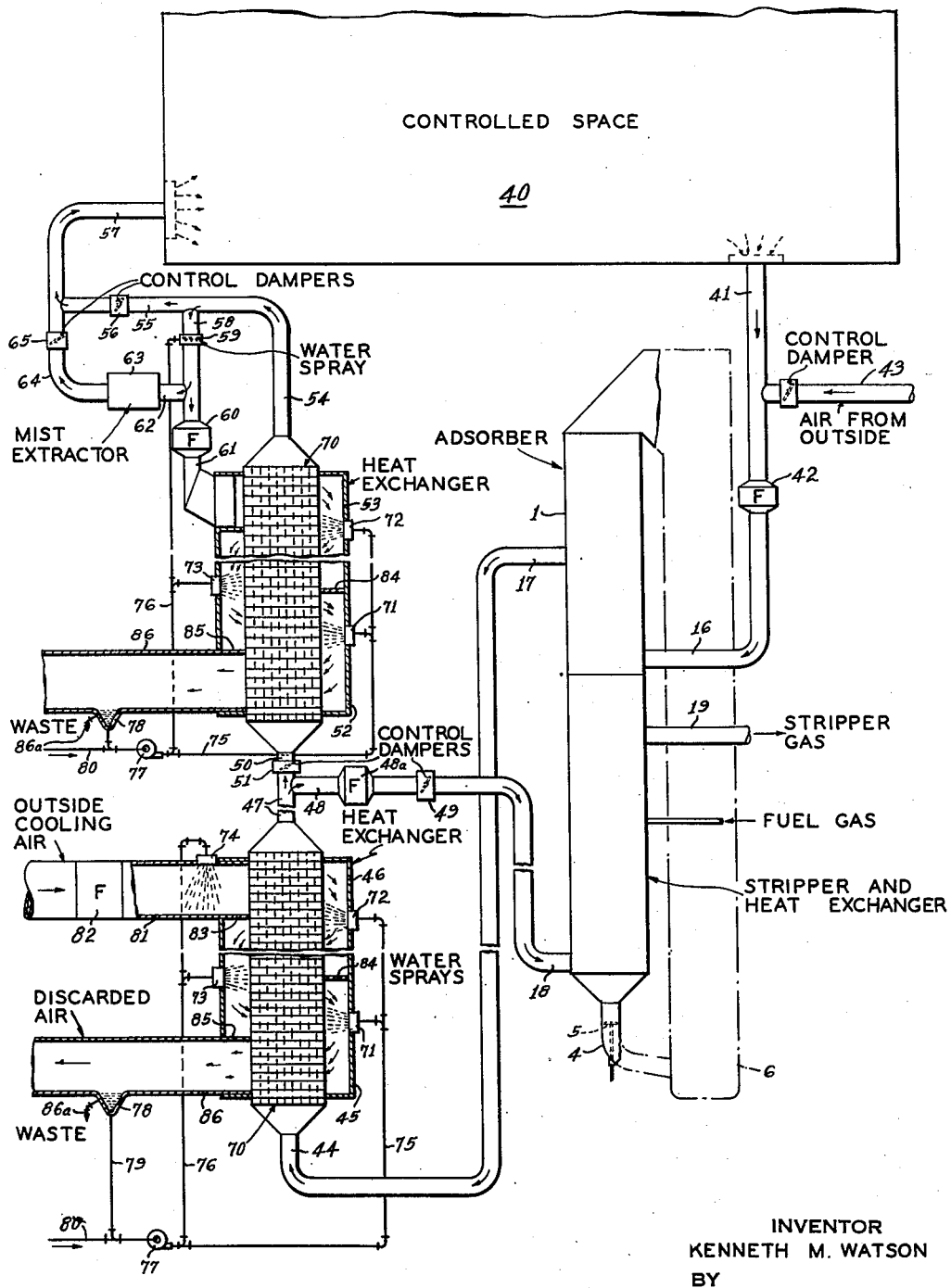
Fig. 3 shows the use of the apparatus of Fig. 1 in an air conditioning system for controlling the temperature and humidity of the air.

In Fig. 3 is shown diagrammatically a representative application and embodiment of the process and apparatus as applied to the control of the temperature and humidity of air. In this figure, the controlled space from which air is to be withdrawn and to which air is to be supplied, is indicated at 40 connected through the pipe 41 having fan 42 therein with the inlet 16. A branch line 43 with control damper therein permits a regulated amount of outside air to be admixed with the air from the control space and supplied to the inlet 16 of the adsorption tower 1 in which the air is dried.

The dried air leaving the adsorption tower through the outlet 17 passes through the pipe 44 to a heat exchanger 70 enclosed in a casing having lower and upper sections 45 and 46. The cooled air from this heat exchanger passes through the pipe 47 and is in part drawn off through the branch pipe 48 having a fan 48a and a control damper 49 therein to the inlet 18 at the bottom of the tower 1. The remainder of the cooled, dry air passes upwardly through the pipe 50 having control damper 51 therein and passes through a second heat exchanger 70 similarly enclosed in a casing having lower and upper chambers 52 and 53 therein. From the top of the second heat exchanger 70 the dry, cooled air passes through the line 54 and a regulated proportion of this dry, cooled air passes through the lines 55 having control damper 56 therein and the line 57 back to the control space. A portion of the dry, cool air escaping through the pipe 54 is passed downwardly through the pipe 58 having a water spray 59 therein and a part of the resulting wet, cool air passes downwardly through the fan 60 and the pipe 61 to the upper portion of the heat exchanger. Another portion of the wet, cool air passes through the pipe 62 and the mist extractor 63 and then through the pipe 64 with control damper 65 therein and the pipe 57 to the control space. The fans 48a and 60 may be omitted, as where the effluent ducts 19 and 86 discharge to a stack with an induced fan draft (not shown).

Figure 4:
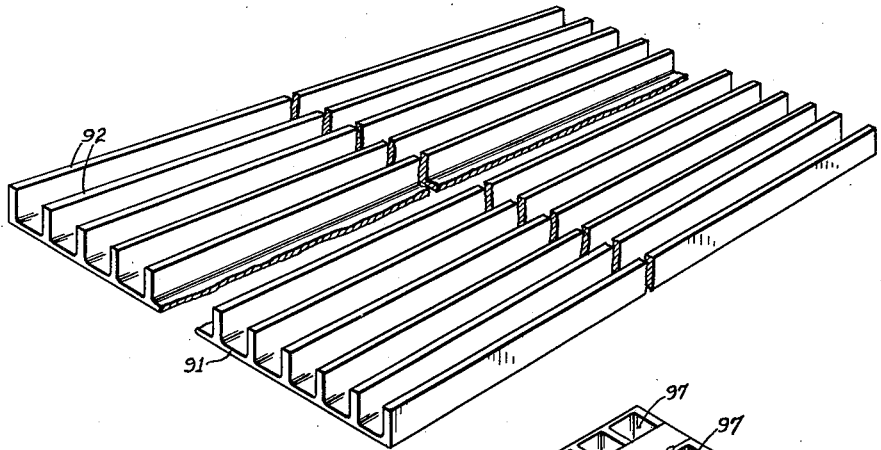
Fig. 4 shows one form of rolled plate advantageously used in the heat exchangers of the apparatus of Fig. 3.
Figure 5:
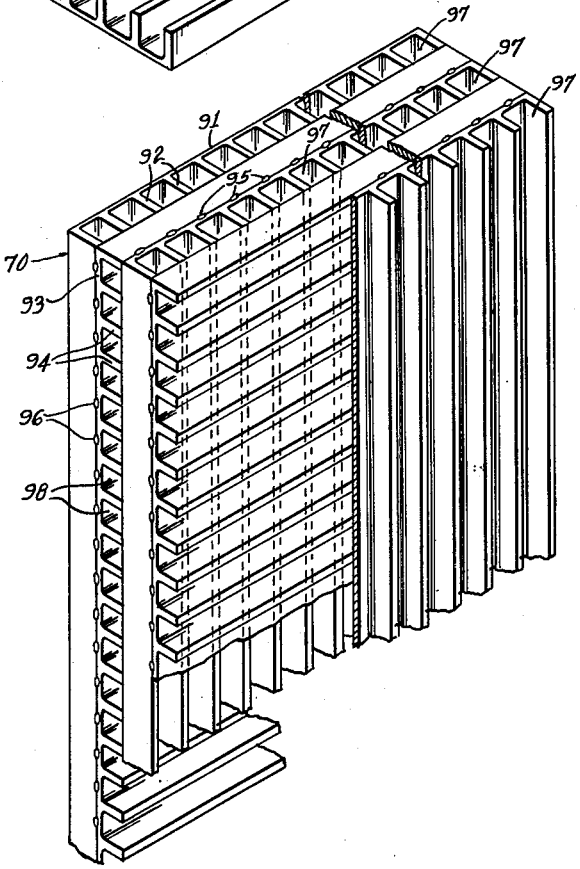
Fig. 5 shows an advantageous method of constructing the heat exchangers of Fig. 3 by the use of the plates illustrated in Fig. 4.

The heat exchangers 70 are shown as indirect heat exchangers made up of a series of rolled aluminum sheets 91 having longitudinal fins 92 formed on one side thereof and illustrated in Fig. 4. The fins 92 are shown as separated by a distance approximately equal to their height so that when the fin side of one plate is placed against the plane side of another plate, as illustrated in Fig. 5, a multiplicity of approximately square channels are formed for the flow of gas. The heat exchanger is formed by assembling the plates with the fins on adjacent plates at right angles to each other as illustrated in Fig. 5. The edges of the plates are crimped or welded together as indicated at 95 and 96 or otherwise sealed to prevent leakage. Thus, it will be seen that the sheet 91 in Fig. 5 has the fins 92 vertically arranged and the adjacent sheet 93 has the fins 94 thereof horizontally arranged. This construction provides vertical passages 97 for the flow of gases upwardly through the exchanger alternating with horizontal passages 98 for the passage of gas laterally through the exchanger. The fins of the sheets serve the dual purpose of rigidly spacing the plates and also increasing the effective heat transfer surface. The construction illustrated in Fig. 5 gives a compact and effective heat transfer unit.

In the apparatus illustrated in Fig. 3, the lower heat exchanger 70 has water sprays 71, 72 and 73 discharging into the gases passing back and forth through the horizontal passages of the heat exchanger. Outside cooling air is introduced by the fan 82 through pipe 81 having a water spray 74 therein and passes through the upper horizontal passages of the heat exchanger and then back and forth through lower passages of the heat exchanger and is discharged through the pipe 86. If the pipe 86 discharges to a stack having an induced fan draft, the fan 82 may be omitted. The exchanger casing has partitions 83, 84 and 85 which cause the air to pass back and forth through horizontal passages at successively lower levels. The excess water is collected at 78 and is returned through the line 79, the pump 77 and the line 75 and 76 to the water sprays so that the same water can be in part used over again with the supply of additional water as required through the supply pipe 80, and withdrawal of waste-water through the draw-off 86a to prevent accumulation of sludge or scale.

The upper heat exchange is similarly constructed with a water spray and with provision for circulating the saturated air back and forth through the horizontal passages of the exchanger. While the upper exchanger can similarly be supplied with outside cooling air, the same as the lower heat exchanger, it is shown as utilizing a portion of the dry, cool gas which is saturated with water and used as the cooling medium.

In the apparatus illustrated the warm, dry air from the adsorber is cooled in the two successive indirect heat exchangers. In the first, the cooling medium is outside air which is maintained at the necessary temperature conditions by passing an excess of air through the exchanger. In the second heat exchanger a portion of the dry, cool air is saturated with water and used as the cooling medium. This arrangement requires very little water since the cooling is accomplished by vaporization of the water in both exchangers, making use of the high latent heat of vaporization to remove heat. This arrangement is desirable where no satisfactory supply of cold water is available for cooling to the necessary temperature, e. g., approximately 80° F. Where such water is available, either or both of the exchangers can be replaced by conventional cooling coils.

In the operation of the complete apparatus illustrated in Fig. 3, the air from the controlled space admixed with fresh air from the atmosphere is passed through the adsorption tower with cross-current and counter-current flow of the air in contact with the adsorbent and the resulting dry air is then passed through the heat exchangers. A portion of the dry air is drawn off through the line 48 to the bottom of the heat exchangers where it serves to cool the adsorbent while it is itself heated, and its temperature is then further raised by the gas flame before its passage through the stripper section to dry the adsorbent, and this stripper gas then passes to waste.

The main portion of the dry, cool gas has its humidity adjusted and is then passed back to the controlled space. Its humidity is adjusted and controlled by drawing off a portion of this gas and spraying water into it and admixing the resulting moist gas in regulated amount with the remaining portion of the gas.

A flow sheet illustrative of a representative application of the process when carried out in an apparatus such as shown in Fig. 3 is given in Fig. 6 with illustrative and approximate temperatures and humidities of the air at the various stages of the process, it being understood that these temperatures and humidities are illustrative and not limiting. The figures given for the weights and rates of flow at different stages refer to dry air or dry gel. The humidity indicated by $h$ represents the pounds of water present per pound of dry air. The moisture content $m$ is that of the gel in pounds of water per pound of dry gel. The figures given assume an apparatus of adequate size to handle 1000 lbs. of adsorbent per hour and approximately 6000 lbs. of air per hour.

As shown in the flow sheet a mixture of 4100 pounds of air from the controlled space are admixed with 1900 pounds of air from the atmosphere and the mixed air is supplied at the rate of 6000 pounds per hour to the adsorber where it is dried and cooled in two stages. In the first stage it is cooled in the indirect cooler by outside cooling air saturated with a water spray. In the second cooler it is cooled by indirect contact with saturated air resulting from the use of a small portion of the dry cooled air saturated by water spray. A portion of the cool dry air from the first cooler goes to the stripper and heat exchanger and the resulting stripper gas goes to waste and amounts to approximately 1250 pounds of air per hour.

The remainder of the dry cool air after further cooling is to the extent of 850 pounds of air per hour returned to the control space. The main portion of the cooled dry air is saturated with water and a small proportion amounting to 650 pounds per hour is used in the second cooler and then discarded; while the remaining portion of approximately 3250 pounds per hour of saturated air is returned to the controlled space.

In the operation illustrated, there is 4100 pounds of air per hour withdrawn from the controlled space and admixed with 1900 pounds per hour of outside air and there is ultimately returned to the controlled space 4100 pounds of air of regulated temperature and humidity while the remainder of the air is used either in the heat exchanger and stripper and is charged as stripper gas or used in the second heat exchanger and discarded.

This type of air conditioning has the advantage of economically providing controlled conditions of low humidity and relatively high dry bulb temperature. Such conditions are important in minimizing the temperature shock and sensation of dampness upon entering a conditioned space. The low humidities are also believed to be more advantageous. A further advantage of the process is that with the adsorption conditioning treatment many odors and smokes are removed which would otherwise be recirculated. The elimination of accumulated "air-conditioning odors" is obtained in the operation illustrated by the large proportion of fresh air which is constantly introduced incidental to the use of air for the heat exchange medium.

The improved method of heat exchange with air maintained at such a ratio is one of the advantageous features of the invention both by itself and in combination with the adsorption type of dehumidification illustrated and described.

The process and apparatus of the invention are advantageously used for dehumidification and for air conditioning in combination with forced circulation, hot air heating systems for winter service as well as for cooling the air for summer operation. The apparatus illustrated and described enables the air to be cooled and supplied as air of regulated temperature and humidity for summer time operation. By using hot air or hot products of combustion in either or both of the heat exchangers the air can be heated and its temperature and humidity controlled for winter-time operation.

While the invention has been more particularly described and illustrated for air conditioning, it is also applicable for other purposes such as the removal of other adsorbents from gas streams or the drying of granular solids. Thus, the adsorption section of the apparatus of Figs. 1 and 2 can be used for passing various gases through adsorbent material. The stripper section of the apparatus of Figs. 1 and 2 is essentially a drier and can be used for the drying of granular solids. The cross-current, counter-current flow of gases and solids is accordingly applicable both for drying and removing adsorbable vapors of gases by passing them through the downwardly flowing granular material; while moist granular materials can be dried by passing the granular materials downwardly with cross-current and counter-current flow of drying gases therethrough.

The process and apparatus are also advantageous in carrying out catalytic operations with a granular catalyst which is caused to pass downwardly in the form of a thin bed through a series of zones while the gases or vapors which are to be subjected to the action of the catalyst are caused to pass back and forth through the catalyst.

In some catalytic processes it is advantageous to pass the gases in a generally counter-current manner back and forth through the thin catalyst bed. In other catalytic operations, notably catalytic cracking, it is sometimes desirable to use generally concurrent flow of the catalyst and the reactants in the reactor, which corresponds to the adsorber of the adsorption apparatus. By introducing the gases or vapors in the upper portion of the reaction zone they are caused to pass back and forth across the catalyst bed in a generally concurrent direction, with removal of the reaction products near the bottom of the reaction zone. In counter-current operations the reacting gases or vapors will enter near the bottom and pass back and forth in a generally upward direction and the reaction products will be removed near the top of the reaction zone.

Below the reactor or reaction zone of the catalytic apparatus is advantageously arranged a stripper zone, corresponding to the stripper zone of the adsorption apparatus, and below the stripper zone may be arranged a regenerating zone for regenerating the catalyst. Thus with a counter-current or a concurrent flow in the reaction zone there may be a counter-current flow in the stripper zone and regenerating zone. The catalysts, in such apparatus, will pass downwardly through the reaction zone, the stripper zone, and the regenerating zone, in each of which there will be cross-flow back and forth through the catalyst bed of the reacting, stripping and regenerating gases. Thus where the catalytic reaction produces carbon or carbonaceous deposits in the reaction zone the carbon may be burned out by combustion with an oxidizing gas in the regenerating zone. In other instances where the catalyst is fouled with carbon or other deposits in the reaction zone it may be regenerated in the stripper or regenerating zone and returned for reuse in the process.

In such catalytic apparatus and processes, accordingly, the catalyst will pass downwardly through the catalytic zone, with either concurrent or countercurrent flow of the gases or vapors back and forth through the catalyst; after which the catalyst will pass through an intermediate or stripping section in which reactants and products are removed by a stripping action in counter-flow; and the catalyst will then pass down through the lower or regenerating section in which the catalyst is prepared for reuse by counterflow contact with a regenerating gas which may have the function either of removing a fouling deposit from the catalyst or of modifying the physical and chemical state of the catalyst or both to prepare it for reuse.

It will thus be seen that the present invention provides improved methods and apparatus for bringing about contact between gases and solids in which a thin bed of solid material is caused to pass downwardly through a series of zones and in which the gases are caused to pass back and forth repeatedly through the thin layers of solid material with cross-flow of the gases through the solid material, advantageously in a generally counter-current manner; but with either concurrent or counter-current flow of the gases for certain purposes, particularly for catalytic reactions.

I claim:

1. The cross-flow and counter-flow method of continuously removing an adsorbate from a solid granular adsorbent material received from an adsorption zone wherein adsorbate in a gas stream is removed by the adsorbent material, which comprises continuously flowing a thin laterally supported bed of the solid granular material in a generally downward direction through a stripping zone and a cooling zone, said stripping and cooling zones having a succession of contacting zones at successively lower levels through which the thin laterally supported bed of adsorbent material flows; passing a stream of cool, dry gases back and forth at successively higher levels through the thin bed of solid adsorbent material in the contacting zones of the cooling zone; passing the resulting warm gases into the stripping zone; heating said warm gases in the stripping zone by burning fuel gas in burners in the stripping zone thereby generating hot stripping gases; passing the hot stripping gases back and forth at successively higher levels through the thin bed of solid adsorbent material in the contacting zones of said stripping zone, whereby the adsorbate is stripped from the adsorbent material by the hot gases; removing the cooled adsorbent material from the cooling zone; replacing the fines in the adsorbent material with fresh material; and returning said adsorbent material to said adsorption zone.

2. The cross-flow and counter-flow method of continuously removing an adsorbate from a solid granular adsorbent material received from an adsorption zone wherein adsorbate in a gas stream is removed by the adsorbent material, which comprises continuously flowing a thin laterally supported bed of the solid granular material in a generally downward direction through a stripping zone and a cooling zone, said stripping and cooling zones having a succession of contacting zones at successively lower levels through which the thin laterally supported bed of adsorbent material flows; passing a stream of cool, dry gases back and forth at successively higher levels in indirect heat exchange through the thin bed of solid adsorbent material in the contacting zones of the cooling zone; passing the resulting warm gases into the stripping zone; heating said warm gases in the stripping zone by burning fuel gas in burners in the stripping zone thereby generating hot stripping gases; passing the hot stripping gases back and forth at successively higher levels through the thin bed of solid adsorbent material in the contacting zones of said stripping zone, whereby the adsorbate is stripped from the adsorbent material by the hot gases; removing the cooled adsorbent material from the cooling zone; replacing the fines in the adsorbent material with fresh material; and returning said adsorbent material to said adsorption zone.

KENNETH M. WATSON.

References Cited in the file of this patent

UNITED STATES PATENTS

| Number | Name | Date |
|---|---|---|
| 1,058,291 | Dennis | Apr. 8, 1918 |
| 1,422,007 | Soddy | July 4, 1922 |
| 1,422,008 | Soddy | July 4, 1922 |
| 1,522,480 | Allen | Jan. 13, 1925 |
| 1,538,192 | Leach | May 19, 1925 |
| 1,551,965 | Muller | Sept. 1, 1925 |
| 1,782,244 | Nagel | Nov. 18, 1930 |
| 1,798,307 | Cooper | Mar. 31, 1931 |
| 1,819,643 | Fleisher | Aug. 18, 1931 |
| 1,823,895 | Gray | Sept. 22, 1931 |
| 1,836,301 | Bechthold | Dec. 15, 1931 |
| 1,854,429 | Steely et al. | Apr. 19, 1932 |
| 1,960,510 | Ridgway | May 29, 1934 |
| 2,009,569 | Wallis et al. | July 30, 1935 |
| 2,376,365 | Lassiat | May 22, 1945 |
| 2,395,632 | Litty | Feb. 26, 1946 |
| 2,429,402 | Davis | Oct. 21, 1947 |
| 2,459,425 | Hemminger | Jan. 18, 1949 |

FOREIGN PATENTS

| Number | Country | Date |
|---|---|---|
| 10,775 | Great Britain | July 30, 1884 |
| 500,734 | Great Britain | Feb. 15, 1939 |
| 438,176 | Germany | Dec. 9, 1926 |